W. W. REYNOLDS.
Weighing Scales.
No. 67,349.
Patented July 30, 1867.
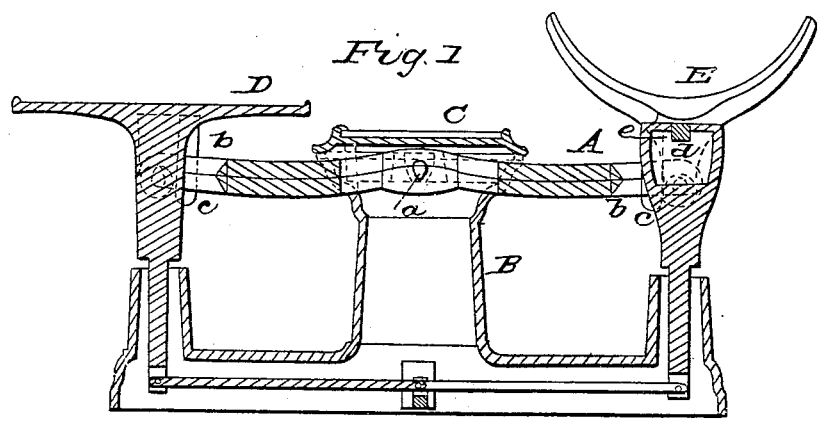
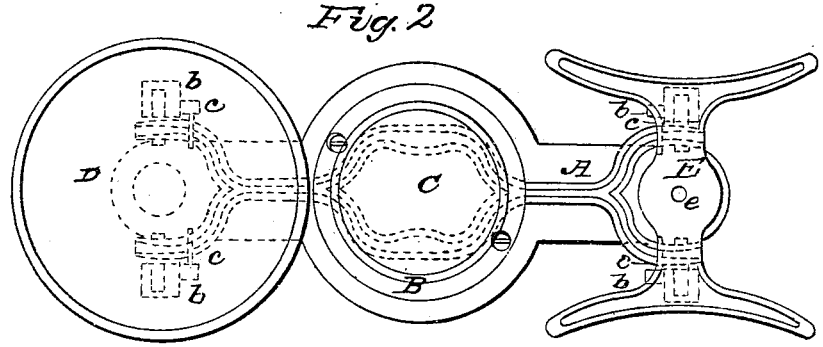
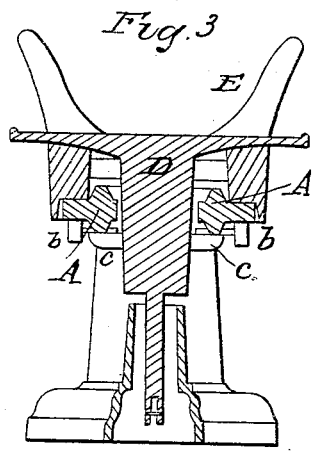
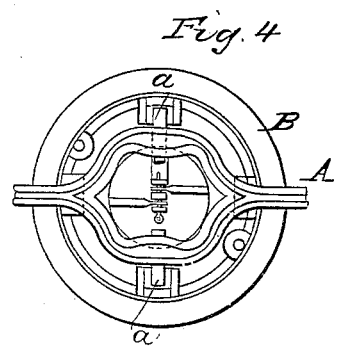
WITNESSES
Samuel N. Piper
G. H. Andrews
INVENTOR
William W. Reynolds
by his attorney
R. H. Eddy

United States Patent Office.

WILLIAM W. REYNOLDS, OF BRANDON, VERMONT, ASSIGNOR TO THE HOWE SCALE COMPANY, OF THE SAME PLACE.

Letters Patent No. 67,349, dated July 30, 1867.

WEIGHING-SCALES.

The Schedule referred to in these Letters Patent and making part of the same.

TO ALL PERSONS TO WHOM THESE PRESENTS MAY COME:

Be it known that I, WILLIAM W. REYNOLDS, of Brandon, in the county of Rutland, and State of Vermont, have invented a new and useful Improvement in Scales for Weighing; and I do hereby declare the same to be fully described in the following specification, and represented in the accompanying drawings, of which—

Figure 1 is a longitudinal section of my improved weighing apparatus.

Figure 2 is a top view of it, without the scale-pan.

Figure 3 is a transverse section, taken through the struts by which the weight-pan is kept in place on the lever.

In these drawings, A denotes a lever whose fulcra $a\ a$ are at its middle, and are duly supported in or on bearings in the upper part of a hollow standard, B, the same being as shown in fig. 4, which is a top view of the lever and the post as uncovered. The said post and the fulcra and bearings are covered and protected from dust and injury by a dished cap, C, which constitutes a support for the weights to be used in the weight-pan. The lever A is to be applied to the weight-pan and scale-pan supporters D E in the ordinary way, and in order to prevent either of these latter from being accidentally thrown off or out of place on the lever, I extend the support downward on opposite sides of the lever, and underneath such lever, or project from the extensions seen at $b\ b$, in fig. 3, two pins or studs $c\ c$, the same being as shown in said fig. 3. I also form within the scale-pan supporter E a chamber, $d$, for receiving shot or other material used for balancing the scale, such chamber being provided with a mouth, $e$, at top, to receive a plug.

I claim in the above-described weighing apparatus the following, viz:

I claim the arrangement and combination of the weight-holder or dished cap C with the standard B, the lever A, and its fulcra.

I also claim the combination and arrangement of the extensions $b\ b$ and the studs $c\ c$, or the equivalent thereof, with the weight and scale-pan supporters, as set forth.

WM. W. REYNOLDS.

Witnesses:
    E. N. BRIGGS,
    E. JUNE.